US012589844B2

(12) United States Patent
Inoue et al.

(10) Patent No.:  US 12,589,844 B2
(45) Date of Patent:  Mar. 31, 2026

(54) CONTROL SYSTEM FOR WATERCRAFT, METHOD FOR CONTROLLING WATERCRAFT, AND WATERCRAFT

(71) Applicant: YAMAHA HATSUDOKI KABUSHIKI KAISHA, Iwata (JP)

(72) Inventors: Hiroshi Inoue, Shizuoka (JP); Hidehiko Harada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 83 days.

(21) Appl. No.: 18/442,327

(22) Filed: Feb. 15, 2024

(65) Prior Publication Data

US 2024/0326964 A1     Oct. 3, 2024

(30) Foreign Application Priority Data

Mar. 27, 2023     (JP) ................................. 2023-050541

(51) Int. Cl.
| | |
|---|---|
| B63B 79/00 | (2020.01) |
| B63B 79/30 | (2020.01) |
| B63B 79/40 | (2020.01) |
| F02D 41/00 | (2006.01) |
| F02D 41/04 | (2006.01) |
| F02D 41/22 | (2006.01) |
| F16H 61/12 | (2010.01) |

(52) U.S. Cl.
CPC .............. B63B 79/40 (2020.01); B63B 79/30 (2020.01); F02D 41/009 (2013.01); F02D 41/042 (2013.01); F02D 41/22 (2013.01); *F16H 61/12* (2013.01); *F02D 2041/224* (2013.01); *F02D 2200/0602* (2013.01); *F02D 2200/101* (2013.01); *F02D 2200/50* (2013.01); *F16H 2061/1288* (2013.01)

(58) Field of Classification Search
None
See application file for complete search history.

(56) References Cited

U.S. PATENT DOCUMENTS

| | | | | |
|---|---|---|---|---|
| 6,446,522 B1 * | 9/2002 | Warren | ............... | F16H 61/2807 |
| | | | | 477/906 |
| 7,762,234 B2 * | 7/2010 | Ulrey | .................. | F02D 41/3845 |
| | | | | 123/456 |
| 9,702,785 B2 * | 7/2017 | Fujino | ................... | G01M 15/05 |
| 2006/0179928 A1 * | 8/2006 | Shikama | ............ | F02M 25/0809 |
| | | | | 73/114.38 |
| 2009/0240423 A1 * | 9/2009 | Fujino | ..................... | F02P 9/005 |
| | | | | 701/111 |
| 2013/0046435 A1 * | 2/2013 | Shin | ........................ | F02N 11/08 |
| | | | | 701/32.8 |

(Continued)

FOREIGN PATENT DOCUMENTS

JP          2011-113538 A        6/2011

*Primary Examiner* — Jelani A Smith
(74) *Attorney, Agent, or Firm* — Keating & Bennett, LLP

(57) ABSTRACT

A control system for a watercraft includes a device on or in the watercraft, a sensor, and a computer. The sensor is operable to detect status data indicating a status of the device. The computer is configured or programmed to store a decision logic to determine whether or not a malfunction or trouble of the watercraft has occurred, and determine whether or not the malfunction or trouble has occurred based on the status data with reference to the decision logic.

17 Claims, 14 Drawing Sheets

(56) References Cited

U.S. PATENT DOCUMENTS

| | | | |
|---|---|---|---|
| 2014/0116401 A1* | 5/2014 | Horiba | F02M 25/0809 |
| | | | 123/520 |
| 2015/0094886 A1* | 4/2015 | Anma | B63H 23/00 |
| | | | 701/21 |
| 2015/0159566 A1* | 6/2015 | Akita | F02D 41/003 |
| | | | 137/488 |
| 2019/0017457 A1* | 1/2019 | Fujimoto | F01L 1/3442 |
| 2019/0311558 A1* | 10/2019 | Bika | G07C 5/0841 |
| 2025/0118118 A1* | 4/2025 | Merg | G06F 3/0484 |

* cited by examiner 73 64

67

100

1

CONTROL SYSTEM FOR WATERCRAFT, METHOD FOR CONTROLLING WATERCRAFT, AND WATERCRAFT

CROSS REFERENCE TO RELATED APPLICATIONS

This application claims the benefit of priority to Japanese Patent Application No. 2023-050541 filed on Mar. 27, 2023. The entire contents of this application are hereby incorporated herein by reference.

BACKGROUND OF THE INVENTION

1. Field of the Invention

The present invention relates to control systems for watercraft, methods for controlling watercraft, and watercraft.

2. Description of the Related Art

There has been known a system that a computer installed in a watercraft detects status data from a variety of devices in the watercraft, and then, based on the status data indicating statuses of the devices, determines whether or not a malfunction or trouble of the watercraft has occurred. For example, Japan Laid-open Patent Application Publication No. 2011-113538 describes that a watercraft information collecting device is installed in a watercraft. The watercraft information collecting device obtains watercraft information of a variety of devices and determines whether or not a malfunction or trouble has occurred based on values of the watercraft information. The watercraft information collecting device is communicable with an onshore server and transmits the watercraft information to the onshore server when it is determined that the malfunction or trouble has occurred.

In the system described above, the computer stores a decision logic to determine whether or not the malfunction or trouble has occurred. With reference to the decision logic, the computer determines whether or not the malfunction or trouble has occurred based on the status data. For example, the watercraft information collecting device obtains a value detected by a vibrometer and determines that the malfunction or trouble has occurred when the detected value is greater than a threshold.

However, a variety of malfunctions or troubles occur in watercraft. For example, a watercraft is equipped with a marine propulsion device including an engine. The engine includes an injector. Chances are that fuel leakage is caused at the injector due to, for instance, lack of maintenance of the engine.

Additionally, a timing belt is wound about a crankshaft and a camshaft in the engine. Chances are that displacement or stretching of the timing belt has occurred.

Moreover, the marine propulsion device includes a dog clutch engaged with either a forward moving gear or a rearward moving gear in a switchable manner. When abraded, the dog clutch cannot be appropriately engaged with the forward moving gear or the rearward moving gear, and chances are that it takes time for the dog clutch to be engaged with the forward moving gear or the rearward moving gear.

Furthermore, a starter motor is connected to the engine. The starter motor rotates the crankshaft of the engine such that the engine is started. However, when a malfunction or trouble has occurred in the starter motor, chances are that engine starting is difficult even if a battery has a sufficient voltage or current.

When engine stall has occurred in the watercraft, it is not easy to determine whether or not the engine stall has been caused due to a malfunction or trouble. For example, when the watercraft is equipped with a kill switch, the engine is stopped as well in response to the kill switch being operated by a user of the watercraft. In this case, it is difficult to distinguish whether the engine stall has been caused due to the malfunction or trouble of the engine or due to the kill switch being operated by the user.

It is not easy for the user to determine an occurrence of the malfunction or trouble described above in an initial phase of the occurrence of the malfunction or trouble.

SUMMARY OF THE INVENTION

Example embodiments of the present invention provide control systems for watercraft, methods for controlling watercraft, and watercraft such that a user of the watercraft is able to determine an occurrence of a malfunction or trouble of the watercraft in an initial phase of the occurrence of the malfunction or trouble.

A control system for a watercraft according to an example embodiment of the present invention includes a device on or in the watercraft, a sensor to detect status data indicating a status of the device, and a computer configured or programmed to store a decision logic to determine whether or not a malfunction or trouble of the watercraft has occurred, and determine whether or not the malfunction or trouble of the watercraft has occurred based on the status data with reference to the decision logic.

A method according to another example embodiment of the present invention relates to a method for controlling a watercraft including a watercraft body and a device installed on or in the watercraft body. The method includes obtaining status data indicating a status of the device and determining whether or not a malfunction or trouble of the watercraft has occurred based on the status data with reference to a decision logic to determine whether or not the malfunction or trouble of the watercraft has occurred.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
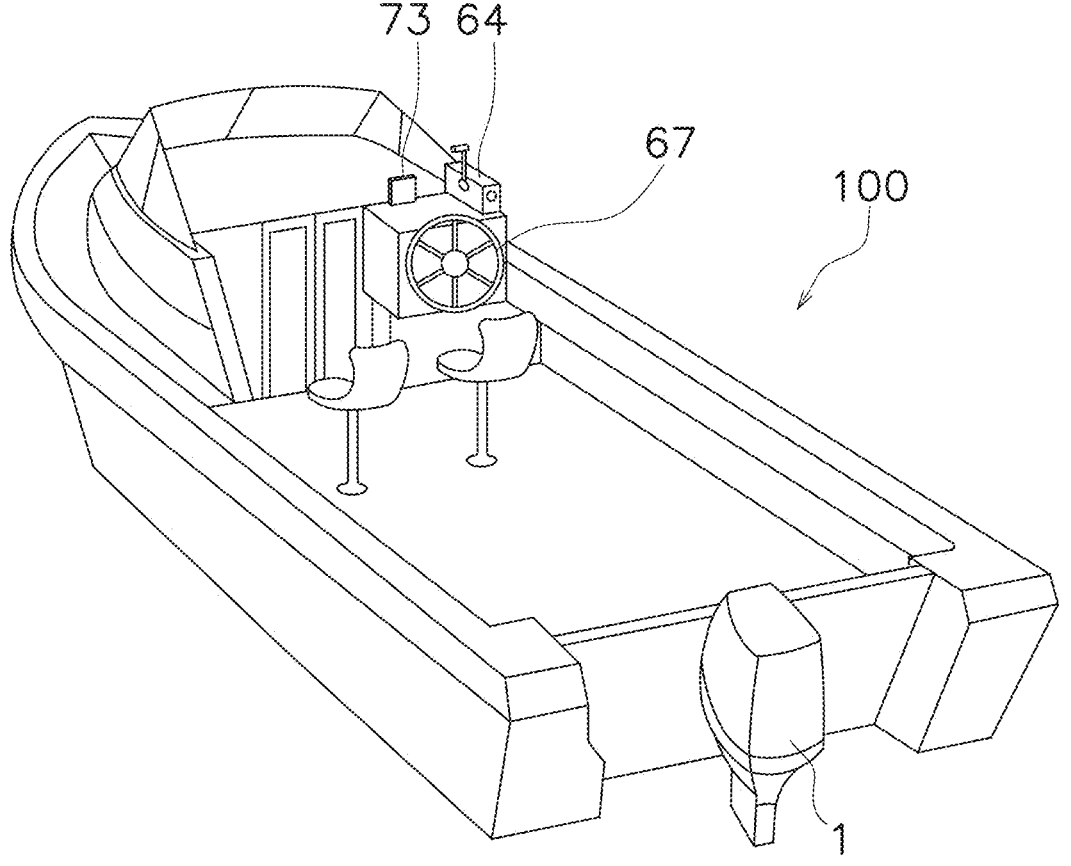
FIG. 1 is a perspective view of a watercraft according to an example embodiment of the present invention.

Example embodiments of the present invention will be hereinafter explained with reference to drawings. FIG. 1 is a perspective view of a watercraft 100 according to an example embodiment of the present invention. A marine propulsion device 1 is attached to the stern of the watercraft 100. The marine propulsion device 1 generates a thrust to propel the watercraft 100. In the present example embodiment, the marine propulsion device 1 is an outboard motor. The marine propulsion device 1 is attached to the watercraft 100 through a bracket 2.

Figure 2:
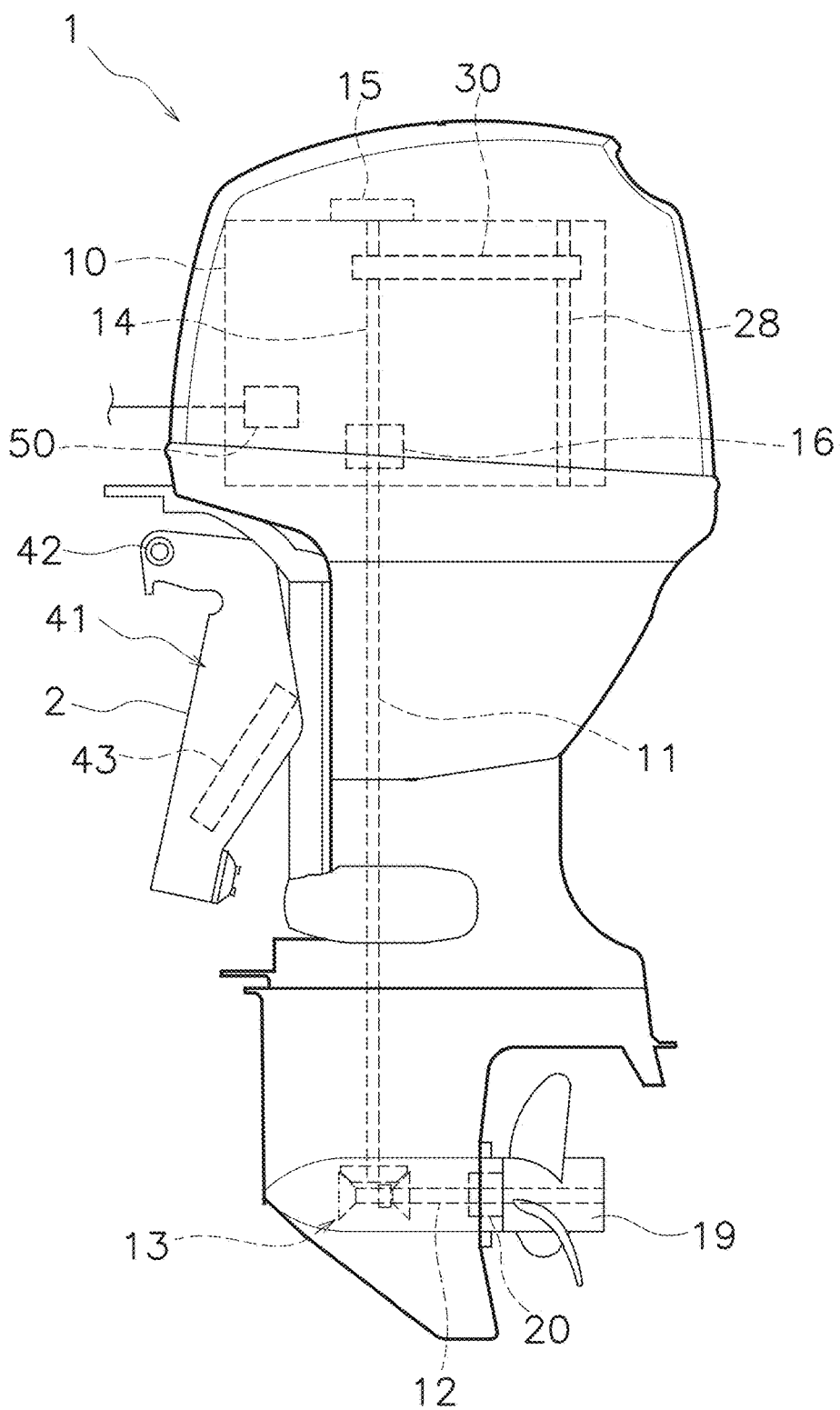
FIG. 2 is a side view of a marine propulsion device.

FIG. 2 is a side view of the marine propulsion device 1. As shown in FIG. 2, the marine propulsion device 1 includes an engine 10, a drive shaft 11, a propeller shaft 12, and a shift mechanism 13. The engine 10 generates the thrust to propel the watercraft 100 as a drive source. The engine 10 includes a crankshaft 14. The crankshaft 14 extends in a vertical direction. A flywheel 15 is connected to the crankshaft 14. The engine 10 includes a starter motor 16. The starter motor 16 is connected to the crankshaft 14 so as to start the engine 10.

Figure 3:
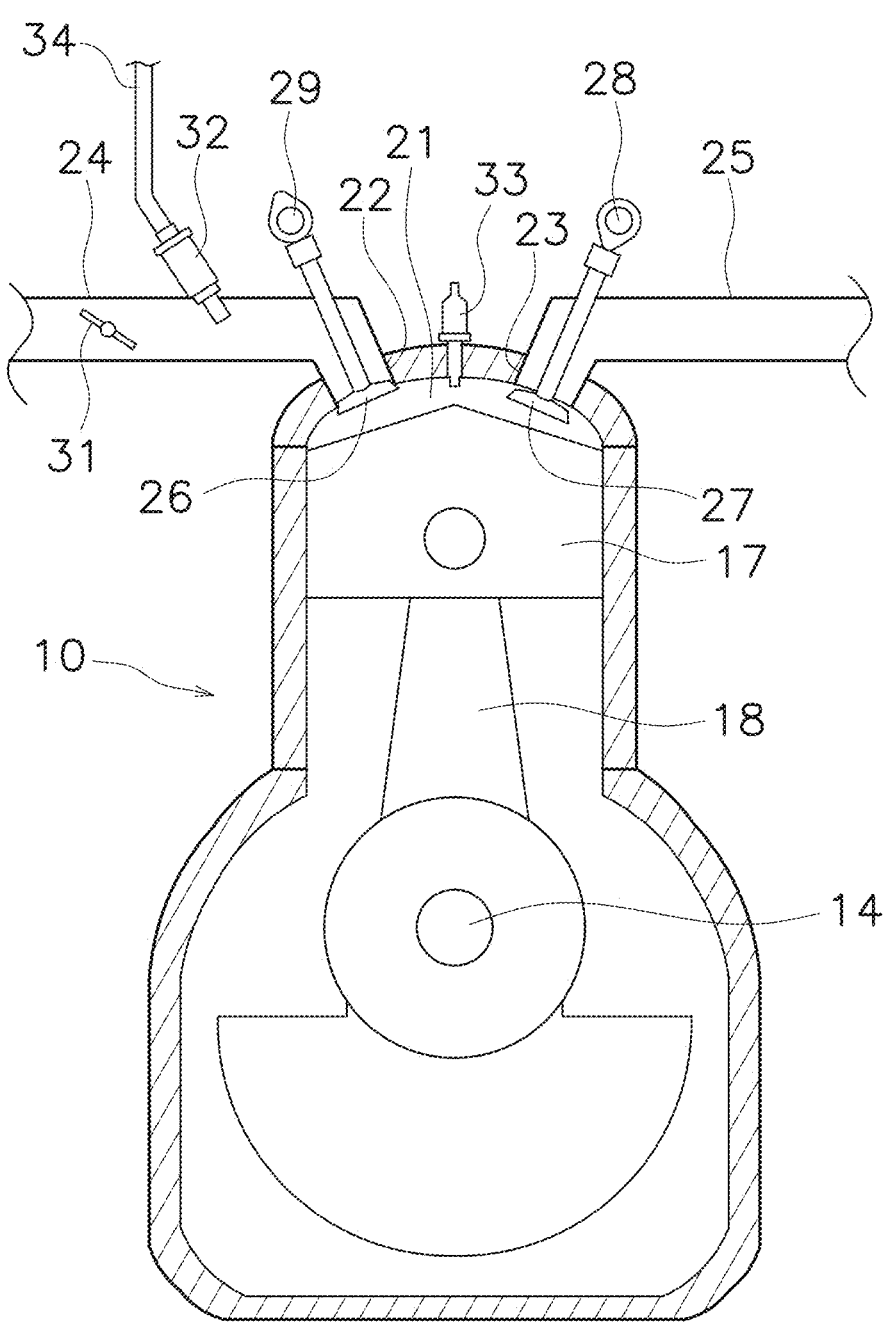
FIG. 3 is a schematic cross-sectional view of an engine.

FIG. 3 is a schematic cross-sectional view of the engine 10. As shown in FIG. 3, the engine 10 includes a piston 17 and a connecting rod 18. The piston 17 is connected to the crankshaft 14 through the connecting rod 18. The engine 10 includes a combustion chamber 21, an intake port 22, and an exhaust port 23. The intake port 22 and the exhaust port 23 are in communication with the combustion chamber 21. The engine 10 includes an intake pipe 24, an exhaust pipe 25, an intake valve 26, and an exhaust valve 27.

The intake pipe 24 is connected to the intake port 22. The intake valve 26 opens and closes the intake port 22. The exhaust pipe 25 is connected to the exhaust port 23. The exhaust valve 27 opens and closes the exhaust port 23. The engine 10 includes an exhaust camshaft 28 and an intake camshaft 29. The exhaust camshaft 28 and the intake camshaft 29 are connected to the crankshaft 14 through a timing belt 30 shown in FIG. 2. The intake valve 26 is driven by the intake camshaft 29. The exhaust valve 27 is driven by the exhaust camshaft 28.

The engine 10 includes a throttle valve 31, a fuel injection device 32, and an ignition device 33. The throttle valve 31 is attached to the intake pipe 24. The amount of mixture gas to be fed to the combustion chamber 21 is regulated by changing the opening degree of the throttle valve 31. The fuel injection device 32 is attached to the intake pipe 24. A delivery pipe 34 is connected to the fuel injection device 32. The delivery pipe 34 is kept at a predetermined pressure in the interior thereof and supplies fuel therethrough to the fuel injection device 32. The fuel injection device 32 injects the fuel into the intake pipe 24. The ignition device 33 is inserted into the combustion chamber 21 and ignites the fuel.

As shown in FIG. 2, the drive shaft 11 is connected to the crankshaft 14. The drive shaft 11 extends in the vertical direction. The drive shaft 11 extends downward from the engine 10. The propeller shaft 12 extends in a back-and-forth direction of the marine propulsion device 1. The propeller shaft 12 is connected to the drive shaft 11 through the shift mechanism 13. A propeller 19 is connected to the propeller shaft 12 through a propeller damper 20. The propeller damper 20 is made of an elastic material such as rubber. The shift mechanism 13 switches the rotational direction of mechanical power to be transmitted from the drive shaft 11 to the propeller shaft 12.

Figure 4A:
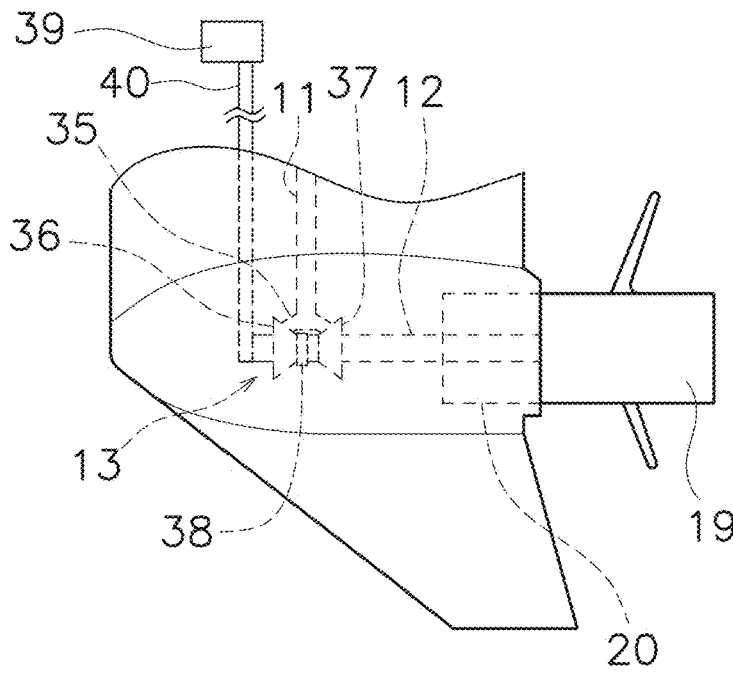
FIG. 4A is an enlarged view of a shift mechanism.
Figure 4B:
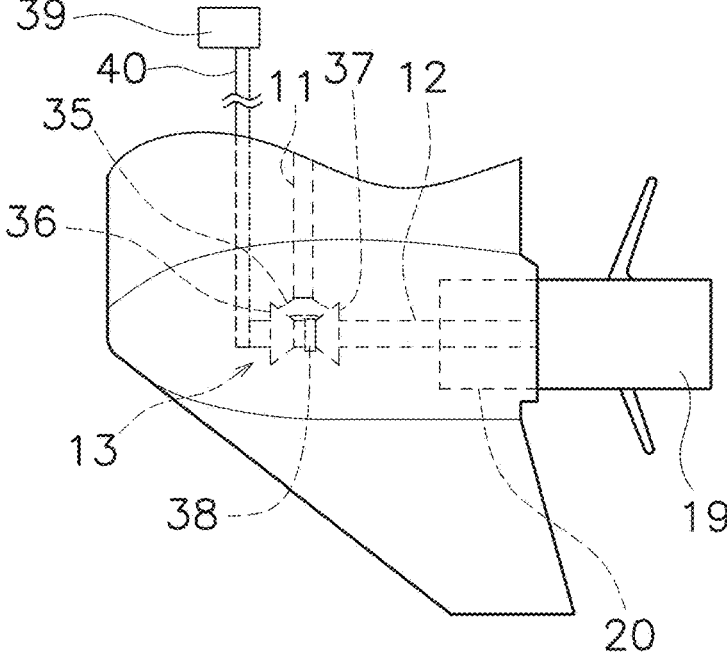
FIG. 4B is an enlarged view of the shift mechanism.
Figure 5A:
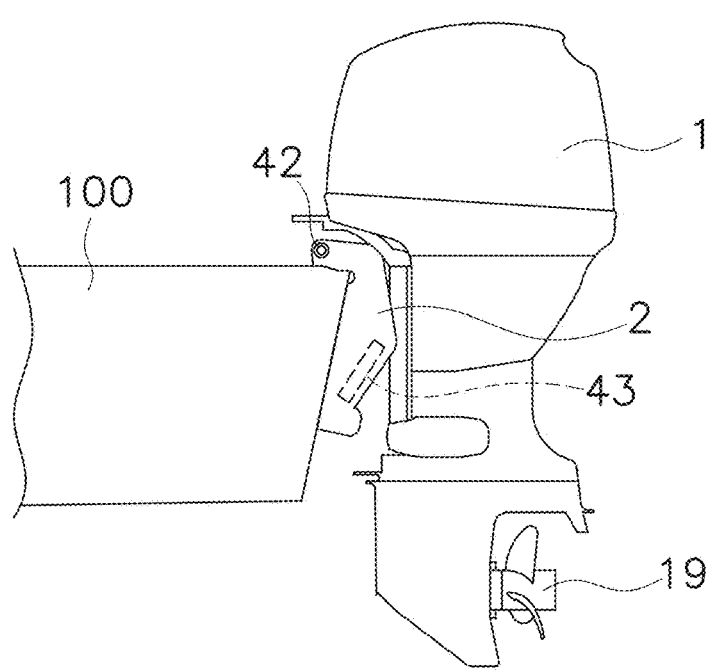
FIG. 5A is a diagram showing a tilt motion of the marine propulsion device.
Figure 5B:
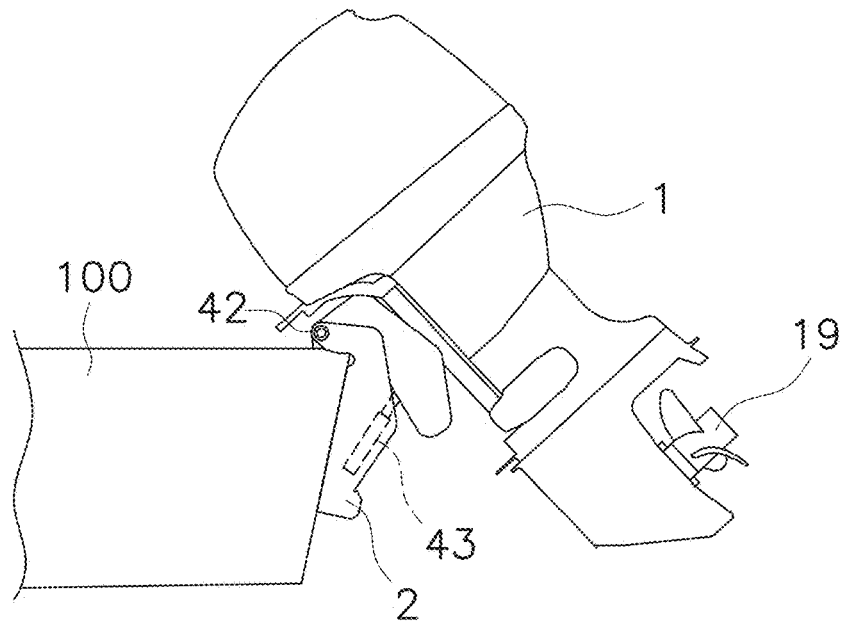
FIG. 5B is a diagram showing the tilt motion of the marine propulsion device.

FIGS. 4A and 4B are enlarged views of the shift mechanism 13. As shown in FIGS. 4A and 4B, the shift mechanism 13 includes a drive gear 35, a forward moving gear 36, a rearward moving gear 37, a dog clutch 38, and a shift actuator 39. The drive gear 35 is connected to the drive shaft 11. The drive gear 35, the forward moving gear 36, and the rearward moving gear 37, each of which is a bevel gear, are meshed with each other. The forward moving gear 36 and the rearward moving gear 37 are coaxial to the propeller shaft 12 so as to be freely rotatable with respect thereto. The dog clutch 38 is movable to a forward moving position, a rearward moving position, and a neutral position.

FIG. 4A shows the dog clutch 38 located in the forward moving position. When located in the forward moving position, the dog clutch 38 causes the forward moving gear 36 to be engaged with the propeller shaft 12, while causing the rearward moving gear 37 to be disengaged from the propeller shaft 12. Accordingly, the shift mechanism 13 transmits the rotation of the drive shaft 11 to the propeller shaft 12 such that the propeller shaft 12 is rotated in a forward moving direction. FIG. 4B shows the dog clutch 38 located in the rearward moving position. When located in the rearward moving position, the dog clutch 38 causes the rearward moving gear 37 to be engaged with the propeller shaft 12, while causing the forward moving gear 36 to be disengaged from the propeller shaft 12. Accordingly, the shift mechanism 13 transmits the rotation of the drive shaft 11 to the propeller shaft 12 such that the propeller shaft 12 is rotated in a rearward moving direction.

The neutral position is located between the forward moving position and the rearward moving position. When located in the neutral position, the dog clutch 38 causes both the forward moving gear 36 and the rearward moving gear 37 to be disengaged from the propeller shaft 12. Accordingly, the rotation of the drive shaft 11 is not transmitted to the propeller shaft 12. The shift actuator 39 causes the dog clutch 38 to be moved among the forward moving position, the neutral position, and the rearward moving position. Accordingly, engagement between the dog clutch 38 and the gears 35 to 37 and disengagement therebetween are switched. The shift actuator 39 includes, for instance, an electric motor. The shift actuator 39 is connected to the dog clutch 38 through a shift member 40.

As shown in FIG. 2, the marine propulsion device 1 includes a tilt mechanism 41. The tilt mechanism 41 is attached to the watercraft 100. The tilt mechanism 41 includes a tilt shaft 42 and a tilt actuator 43. The tilt mechanism 41 supports the marine propulsion device 1 such that the marine propulsion device 1 is pivotable about the tilt shaft 42. The tilt actuator 43 includes, for instance, a hydraulic cylinder. The tilt actuator 43 may be another type of actuator such as an electric cylinder. As shown in FIGS.

5A and 5B, the tilt actuator 43 causes the marine propulsion device 1 to pivot about the tilt shaft 42.

Figure 6:
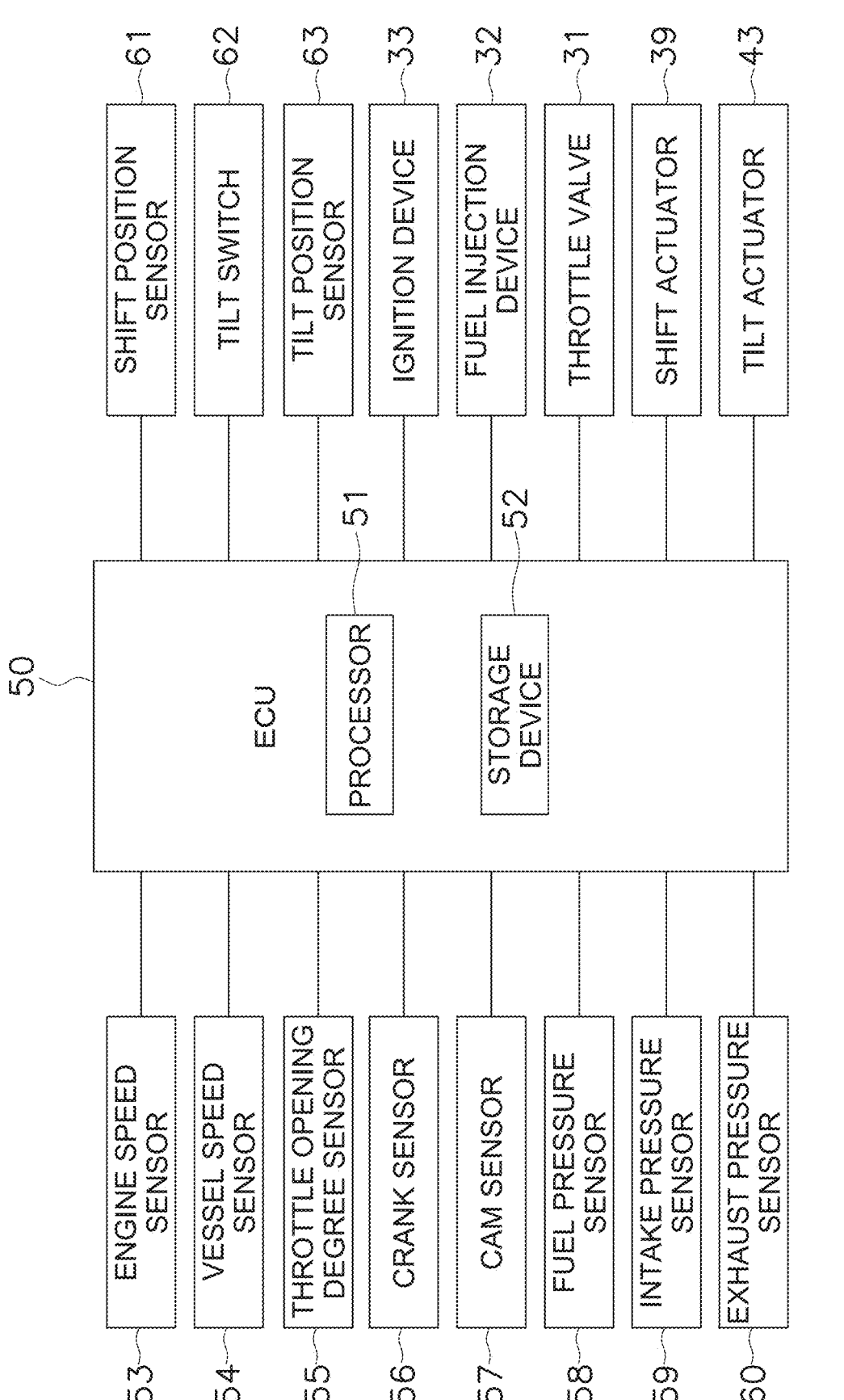
FIG. 6 is a block diagram showing a control system for the marine propulsion device.

FIG. 6 is a block diagram showing a control system for the marine propulsion device 1. As shown in FIG. 6, the marine propulsion device 1 includes an ECU (Engine Control Unit) 50. The ECU 50 is an electronic control device to control the engine 10. The ECU 50 includes a processor 51 such as a CPU (Central Processing Unit) and a storage device 52. The storage device 52 includes memories such as a RAM (Random Access Memory) and a ROM (Read Only Memory). The storage device 52 may include a storage such as an HDD (Hard Disk Drive) or an SSD (Solid State Drive). The storage device 52 includes stored programs and data to control the marine propulsion device 1. The processor 51 controls the marine propulsion device 1 based on the programs and data.

The marine propulsion device 1 includes an engine speed sensor 53, a vessel speed sensor 54, and a throttle opening degree sensor 55. The engine speed sensor 53 detects an engine rotational speed. The engine speed sensor 53 outputs a signal, indicating the engine rotational speed, to the ECU 50. The vessel speed sensor 54 detects a vessel speed. The vessel speed sensor 54 outputs a signal, indicating the vessel speed, to the ECU 50. The throttle opening degree sensor 55 detects a throttle opening degree. The throttle opening degree sensor 55 outputs a signal, indicating the throttle opening degree, to the ECU 50.

Figure 7:
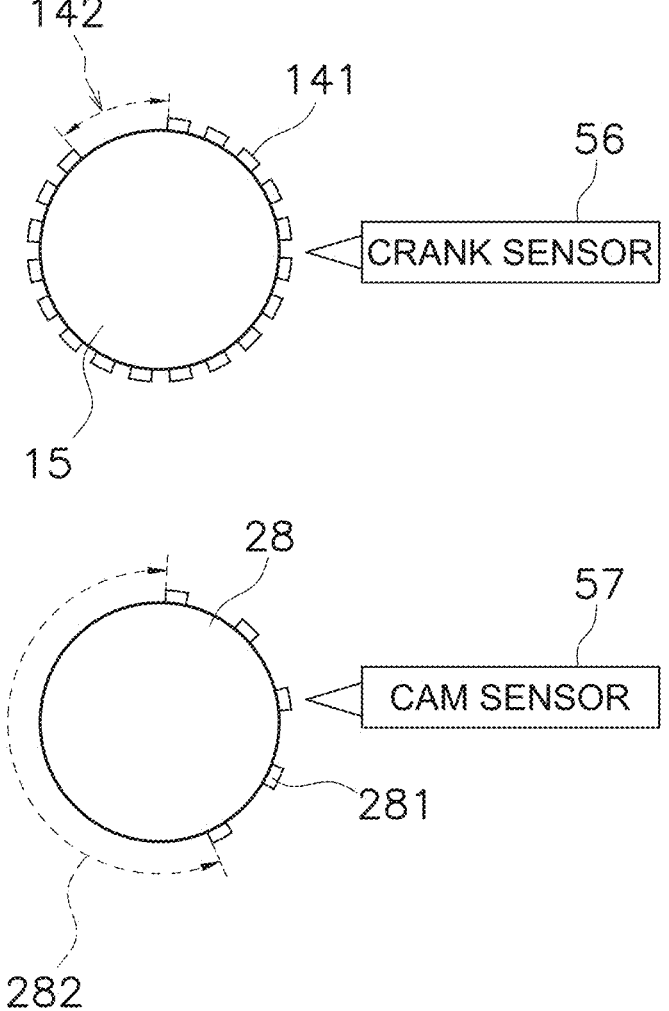
FIG. 7 is a diagram showing a phase detecting method executed by each of a crank sensor and a cam sensor.

The marine propulsion device 1 includes a crank sensor 56 and a cam sensor 57. The crank sensor 56 detects the phase of the crankshaft 14. As shown in FIG. 7, the flywheel 15 connected to the crankshaft 14 is provided with a plurality of protrusions 141 regularly aligned on the surface thereof. The flywheel 15 is provided with a missing region 142 on the surface thereof. The protrusions 141 are not provided in the missing region 142 and the interval between a pair of adjacent protrusions 141 defining the missing region 142 is different from that between each other pair of adjacent protrusions 141. The crank sensor 56 is a magnetic sensor and detects passage of the plurality of protrusions 141. It should be noted that in FIG. 7, reference sign 141 is assigned to only a portion of the plurality of protrusions 141. The crank sensor 56 detects the phase of the crankshaft 14 by detecting the missing region 142. The crank sensor 56 outputs a signal, indicating the phase of the crankshaft 14, to the ECU 50.

The cam sensor 57 detects the phase of the exhaust camshaft 28. The exhaust camshaft 28 is provided with a plurality of protrusions 281 regularly aligned on the surface thereof. It should be noted that the exhaust camshaft 28 is provided with a missing region 282 on the surface thereof. The protrusions 281 are not provided in the missing region 282 and the interval between a pair of adjacent protrusions 281 defining the missing region 282 is different from that between each other pair of adjacent protrusions 281. The cam sensor 57 is a magnetic sensor and detects passage of the plurality of protrusions 281 provided on the exhaust camshaft 28. It should be noted that in FIG. 7, reference sign 281 is assigned to only a portion of the plurality of protrusions 281. The cam sensor 57 detects the phase of the exhaust camshaft 28 by detecting the missing region 282. The cam sensor 57 outputs a signal, indicating the phase of the exhaust camshaft 28, to the ECU 50.

As shown in FIG. 6, the marine propulsion device 1 includes a fuel pressure sensor 58, an intake pressure sensor 59, and an exhaust pressure sensor 60. The fuel pressure sensor 58 detects the pressure of the fuel inside the delivery pipe 34. The fuel pressure sensor 58 outputs a signal, indicating the pressure of the fuel inside the delivery pipe 34, to the ECU 50. The intake pressure sensor 59 detects an intake pressure inside the intake pipe 24. The intake pressure sensor 59 outputs a signal, indicating the intake pressure inside the intake pipe 24, to the ECU 50. The exhaust pressure sensor 60 detects an exhaust pressure inside the exhaust pipe 25. The exhaust pressure sensor 60 outputs a signal, indicating the exhaust pressure inside the exhaust pipe 25, to the ECU 50.

The marine propulsion device 1 includes a shift position sensor 61. The shift position sensor 61 detects the position of the dog clutch 38 (hereinafter referred to as "shift position"). The shift position sensor 61 detects, as the shift position, in which of the forward moving position, the neutral position, and the rearward moving position the dog clutch 38 is located. The shift position sensor 61 outputs a signal, indicating the shift position, to the ECU 50.

The marine propulsion device 1 includes a tilt switch 62 and a tilt position sensor 63. The tilt switch 62 is operable by an operator. The tilt actuator 43 is driven in response to the operation of the tilt switch 62 such that the marine propulsion device 1 pivots about the tilt shaft 42. The tilt position sensor 63 detects the position of the marine propulsion device 1 tilting about the tilt shaft 42. The tilt position sensor 63 outputs a signal, indicating the tilt position of the marine propulsion device 1 about the tilt shaft 42, to the ECU 50. It should be noted that a pivot speed of the marine propulsion device 1 about the tilt shaft 42 is calculated based on the tilt position of the marine propulsion device 1 about the tilt shaft 42.

Figure 8:
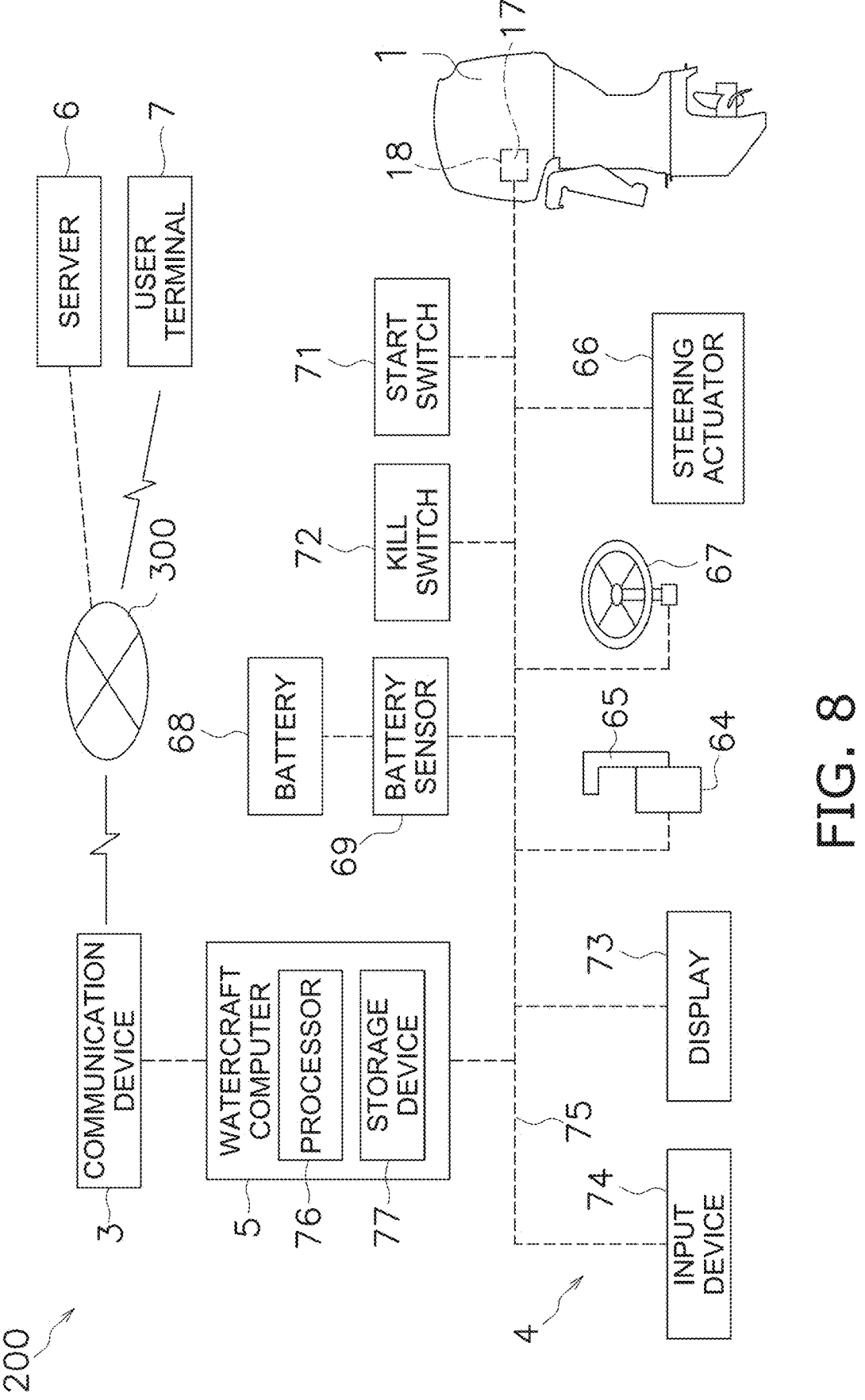
FIG. 8 is a block diagram showing a configuration of a control system for a watercraft according to an example embodiment of the present invention.

FIG. 8 is a schematic diagram showing a configuration of a control system 200 for the watercraft 100 according to an example embodiment of the present invention. As shown in FIG. 8, the control system 200 includes a communication device 3, a device system 4, and a watercraft computer 5. The communication device 3, the device system 4, and the watercraft computer 5 are installed in the watercraft 100. The communication device 3 performs wireless communication with a server 6 disposed remote from the watercraft 100. For example, the communication device 3 is able to perform data communication with external entities, i.e., the server 6 and a user terminal 7, through a mobile communication network 300. The user terminal 7 includes, for instance, a personal computer. The user terminal 7 may be a mobile computer such as a smartphone or a tablet. The mobile communication network 300 is, for instance, a network of a 3G, 4G, or 5G mobile communication system.

The device system 4 includes electric devices installed in the watercraft 100. For example, the device system 4 includes the ECU 50 described above. The device system 4 includes a throttle-shift operating device 64. The throttle-shift operating device 64 is operable by the operator to regulate the engine rotational speed of the marine propulsion device 1. Additionally, the throttle-shift operating device 64 is operable by the operator to switch the operation of the marine propulsion device 1 between a forward moving operation and a rearward moving operation.

The throttle-shift operating device 64 includes a throttle lever 65. The throttle lever 65 is operable from a neutral position to a forward moving position and a rearward moving position. The throttle-shift operating device 64 outputs a throttle signal indicating the operating position of the throttle lever 65. The ECU 50 receives the throttle signal outputted from the throttle-shift operating device 64. The ECU 50 controls the shift mechanism 13 in accordance with the operating position of the throttle lever 65. Accordingly, the rotational direction of the propeller shaft 12 is switched between the forward moving direction and the rearward moving direction. Additionally, the ECU 50 controls the engine rotational speed by controlling the throttle opening degree and the amount of fuel injection in accordance with the operating position of the throttle lever 65.

The device system 4 includes a steering actuator 66 and a steering operating device 67. The steering actuator 66 turns the marine propulsion device 1 right and left so as to change a rudder angle of the marine propulsion device 1. The steering actuator 66 includes, for instance, an electric motor. Alternatively, the steering actuator 66 may include an electric pump and a hydraulic cylinder.

The steering operating device 67 is operable by the operator to adjust the rudder angle of the marine propulsion device 1. The steering operating device 67 includes, for instance, a steering wheel. Alternatively, the steering operating device 67 may be another type of operating device such as a joystick. The steering operating device 67 is operable right and left from a neutral position. The steering operating device 67 outputs a steering signal indicating the operating position thereof. The steering actuator 66 is controlled in accordance with the operating position of the steering operating device 67 such that the rudder angle of the marine propulsion device 1 is controlled.

The device system 4 includes a battery 68 and a battery sensor 69. The battery 68 supplies electric power to the device system 4. The battery sensor 69 includes a voltmeter and an ammeter. The battery sensor 69 detects a voltage and current of the battery 68. The battery sensor 69 outputs a signal, indicating the voltage and current of the battery 68, to the watercraft computer 5.

The device system 4 includes a start switch 71 and a kill switch 72. The start switch 71 and the kill switch 72 are operable by the operator. The start switch 71 starts the engine 10 by driving the starter motor 16. The starter motor 16 is driven by electric power supplied thereto from the battery 68. The kill switch 72 is normally kept turned off. In the off state of the kill switch 72, driving of the engine 10 is enabled. When the kill switch 72 is turned on, driving of the engine 10 is stopped. For example, in the on state of the kill switch 72, the supply of electric power to the ignition device 33 is stopped.

The device system 4 includes a display 73 and an input device 74. The display 73 displays information regarding the marine propulsion device 1. The display 73 displays an image in accordance with an image signal inputted thereto. The input device 74 receives an operational input by a user. The input device 74 outputs an input signal indicating the operational input by the user. The input device 74 includes, for instance, a touchscreen. However, the input device 74 may include at least one hardware key.

The device system 4 includes a CAN (Controller Area Network) 75. The electric devices, included in the device system 4, are connected to each other through the CAN 75 in a communicable manner.

The watercraft computer 5 includes a processor 76 such as a CPU and a storage device 77. The storage device 77 includes memories such as a RAM and a ROM. The storage device 77 may include a storage such as an HDD or an SSD. The storage device 77 includes stored programs and data to control the device system 4. The processor 76 controls the device system 4 based on the programs and data. For example, the watercraft computer 5 controls the device system 4 in accordance with the input signal transmitted thereto from the input device 74. The watercraft computer 5 outputs the image signal to the display 73 such that the display 73 is caused to display a desired image.

The watercraft computer 5 is connected to the ECU 50 in a communicable manner. The watercraft computer 5 obtains status data, indicating statuses of the marine propulsion device 1, through the ECU 50. For example, the watercraft computer 5 obtains the engine rotational speed, the vessel speed, and the throttle opening degree as the status data. The watercraft computer 5 obtains the phase of the exhaust camshaft 28 and that of the crankshaft 14 as the status data. The watercraft computer 5 obtains the fuel pressure, the intake pressure, and the exhaust pressure as the status data. The watercraft computer 5 obtains the shift position and the tilt position as the status data.

Additionally, the watercraft computer 5 obtains the status data, indicating statuses of the other devices in the device system 4, through the CAN 75. For example, the watercraft computer 5 obtains the voltage and current of the battery 68 as the status data. The watercraft computer 5 obtains whether the kill switch 72 is kept turned on or off as the status data.

Figure 9:
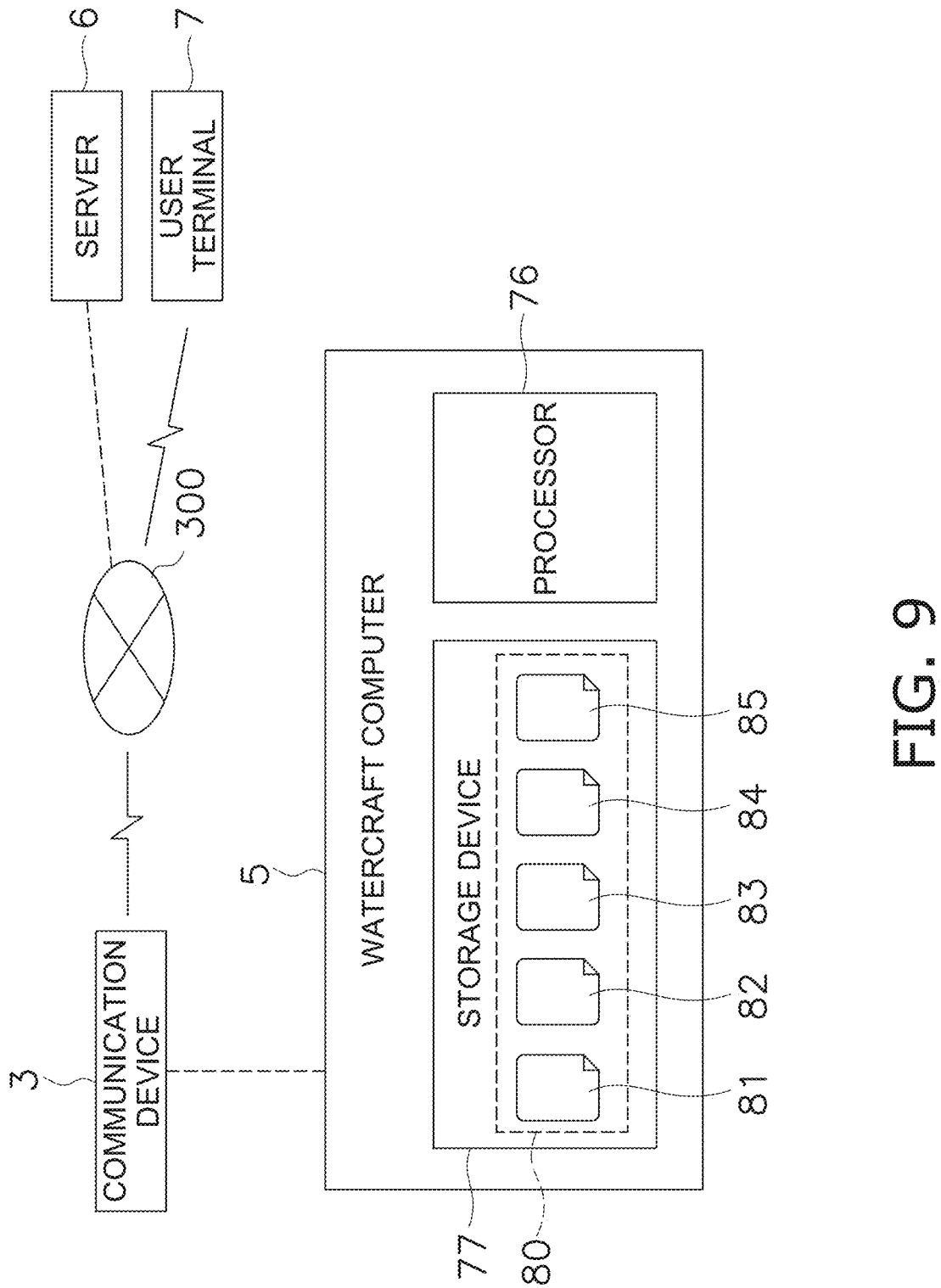
FIG. 9 is a block diagram showing a configuration of a watercraft computer.

As shown in FIG. 9, the watercraft computer 5 stores a decision logic 80 to determine whether or not a malfunction or trouble of the watercraft 100 has occurred. The decision logic 80 includes algorithms associated with a variety of types of malfunctions or troubles on a one-to-one basis so as to determine whether or not a predetermined type of malfunction or trouble has occurred. With reference to the decision logic 80, the watercraft computer 5 determines whether or not the malfunction or trouble of the watercraft 100 has occurred based on the status data. A method to determine the malfunction or trouble of the watercraft 100 will be hereinafter explained.

The decision logic 80 includes an injector leakage logic 81. The injector leakage logic 81 determines whether or not fuel leakage has occurred at the fuel injection device 32 based on the fuel pressure inside the delivery pipe 34. More specifically, the injector leakage logic 81 determines that the malfunction or trouble has occurred when the fuel pressure inside the delivery pipe 34 has decreased by a predetermined value or greater after stopping the engine 10.

Figure 10:
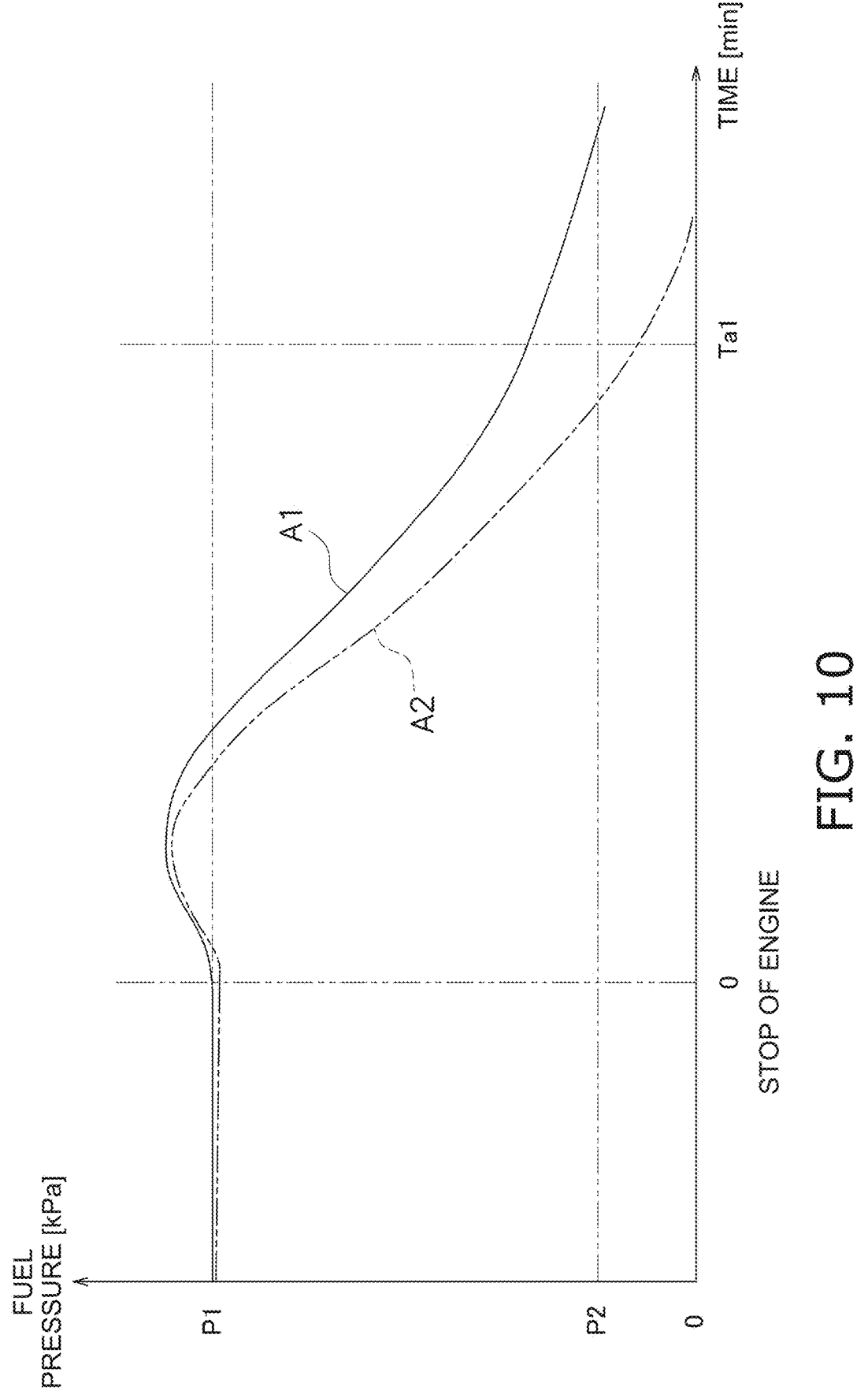
FIG. 10 is a chart showing a variation of fuel pressure inside a delivery pipe.

FIG. 10 is a chart showing a variation of the fuel pressure. In FIG. 10, solid line A1 indicates the variation of the fuel pressure in a normal condition. The watercraft computer 5 stores data indicating the variation of the fuel pressure in the normal condition. In FIG. 10, broken line A2 indicates the variation of the fuel pressure in a malfunction or trouble condition. As shown in FIG. 10, the fuel pressure is kept at a constant value P1 during driving of the engine 10. When the engine 10 is stopped, the fuel is heated such that the fuel pressure temporarily increases, however, the fuel pressure thereafter gradually reduces with an elapse of time. The watercraft computer 5 compares the variation of the fuel pressure indicated by the status data and the variation of the fuel pressure in the normal condition. The watercraft computer 5 determines that the malfunction or trouble regarding injector leakage has occurred when the fuel pressure, indicated by the status data after the elapse of a predetermined time Ta1 from stopping the engine 10, is less than a threshold P2.

The decision logic 80 includes a starter abnormality logic 82. The starter abnormality logic 82 determines whether or not a malfunction or trouble of the starter motor 16 has occurred based on the voltage and current of the battery 68 and the engine rotational speed at a start of the engine 10. More specifically, the watercraft computer 5 stores, as a threshold, the engine rotational speed obtained at the voltage and current of the battery 68 at a start of the engine 10 in the normal condition. The watercraft computer 5 determines that the malfunction or trouble of the starter motor 16 has occurred when the engine rotational speed at a start of the engine 10 is less than the threshold at the voltage and current of the battery 68.

The decision logic 80 includes a belt abnormality logic 83. The belt abnormality logic 83 determines whether or not displacement and/or stretching of the timing belt 30 have occurred based on the phase of the crankshaft 14 and that of the camshaft 28. The timing belt 30 is wound about the crankshaft 14 and the camshaft 28. Thus, the phase of the crankshaft 14 and that of the camshaft 28 periodically vary in synchronization with each other. The belt abnormality logic 83 determines that the malfunction or trouble has occurred when the camshaft 28 is abnormally displaced in phase with respect to the crankshaft 14.

Figure 11:
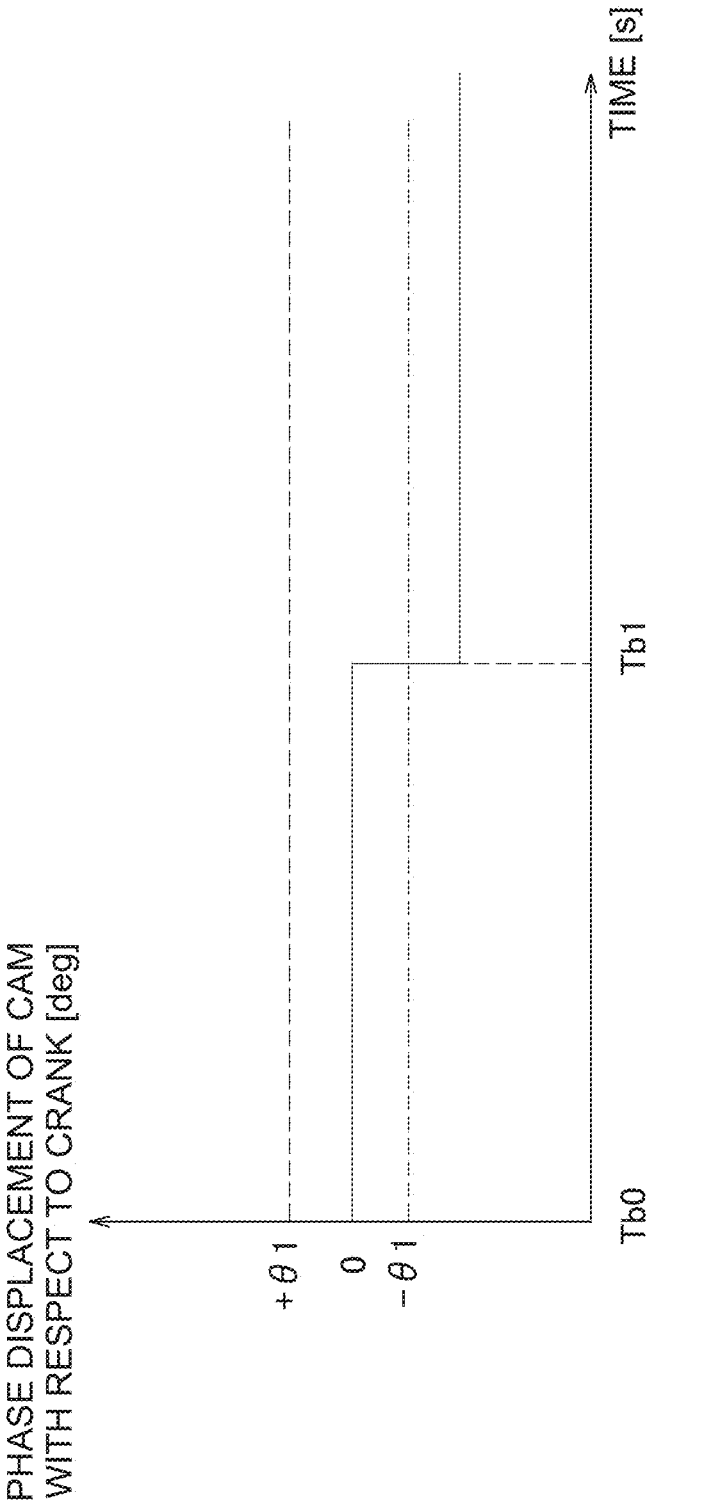
FIG. 11 is a chart showing a variation of phase displacement of a camshaft with respect to a crankshaft.

This determination will be explained in detail with reference to a chart in FIG. 11 showing a variation of phase displacement of the camshaft 27 with respect to the crankshaft 14. Each of the crankshaft 14 and the camshaft 28 includes a plurality of teeth meshed with the timing belt 30. When the teeth of the crankshaft 14 or those of the camshaft 28 are displaced with respect to the timing belt 30, the camshaft 28 is displaced in phase with respect to the crankshaft 14.

As shown in FIG. 11, the phase displacement of the camshaft 28 with respect to the crankshaft 14 is kept at 0 degrees from time Tb0 to time Tb1. In other words, a normal condition is from time Tb0 to time Tb1 without causing displacement of either the camshaft 28 or the crankshaft 14 with respect to the timing belt 30. When the camshaft 28 is displaced in phase with respect to the crankshaft 14 by an angle of greater than a threshold θ1 at time Tb1, the watercraft computer 5 determines that either the camshaft 28 or the crankshaft 14 has been displaced with respect to the timing belt 30.

The threshold θ1 is set based on a variation of the phase of the crankshaft 14 caused when the crankshaft 14 is displaced by one tooth with respect to the timing belt 30 or a variation of the phase of the camshaft 28 caused when the camshaft 28 is displaced by one tooth with respect to the timing belt 30. For example, suppose the number of teeth provided on the crankshaft 14 is 20, then when the crankshaft 14 is displaced by one tooth, the phase thereof is displaced by 18 degrees (=360/20). Suppose the number of teeth provided on the camshaft 28 is 40, then when the camshaft 28 is displaced by one tooth, the phase thereof is displaced by 9 degrees (=360/40).

Figure 12:
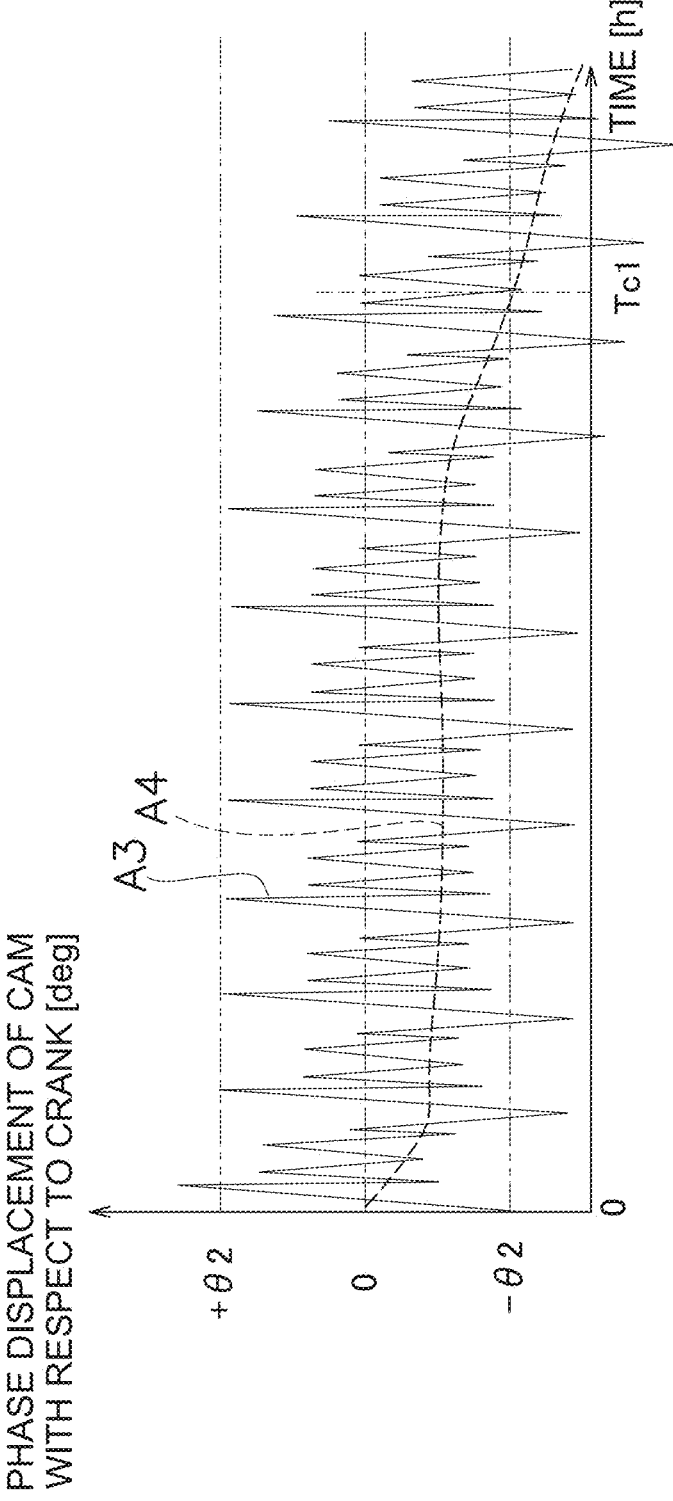
FIG. 12 is a chart showing a variation of phase displacement of the cam shaft with respect to the crankshaft and a variation of average of phase displacement.

Additionally, the belt abnormality logic 83 determines whether or not stretching of the timing belt 30 has occurred based on the phase of the crankshaft 14 and that of the camshaft 28. The timing belt 30 gradually stretches due to deterioration over time. Accordingly, the crankshaft 14 and the camshaft 28 are displaced in phase from each other. FIG. 12 is a chart showing a variation of phase displacement of the camshaft 28 with respect to the crankshaft 14. Stretching of the timing belt 30 gradually advances over a long period of time. FIG. 12 shows phase displacement in a longer period of time than that shown in FIG. 11.

In FIG. 12, solid line A3 indicates the variation of phase displacement of the camshaft 28 with respect to the crankshaft 14. Broken line A4 indicates the variation of an average of the phase displacement. The average of the phase displacement is calculated in, for instance, several thousands of rotations of either the crankshaft 14 or the camshaft 28. When the phase displacement of the camshaft 28 with respect to the crankshaft 14 becomes greater than a threshold θ2 at time Tc1, the watercraft computer 5 determines that either the camshaft 28 or the crankshaft 14 has been displaced with respect to the timing belt 30. It should be noted that in FIG. 12, −θ2 indicates that the phase displacement is caused in a stretching direction of the timing belt 30 by the magnitude of θ2. Additionally, the phase displacement is caused minutely due to stretching of the timing belt 30. Thus, the threshold θ2 is set to be a minute value of, for instance, less than or equal to 1 (degrees).

The decision logic 80 includes a shift slippage logic 84. The shift slippage logic 84 determines that a malfunction or trouble has occurred when a length of time greater than or equal to a predetermined threshold has been required to complete engagement of the dog clutch 38 from a point in time of outputting a signal to command the shift actuator 39 to cause engagement of the dog clutch 38.

Figure 13:
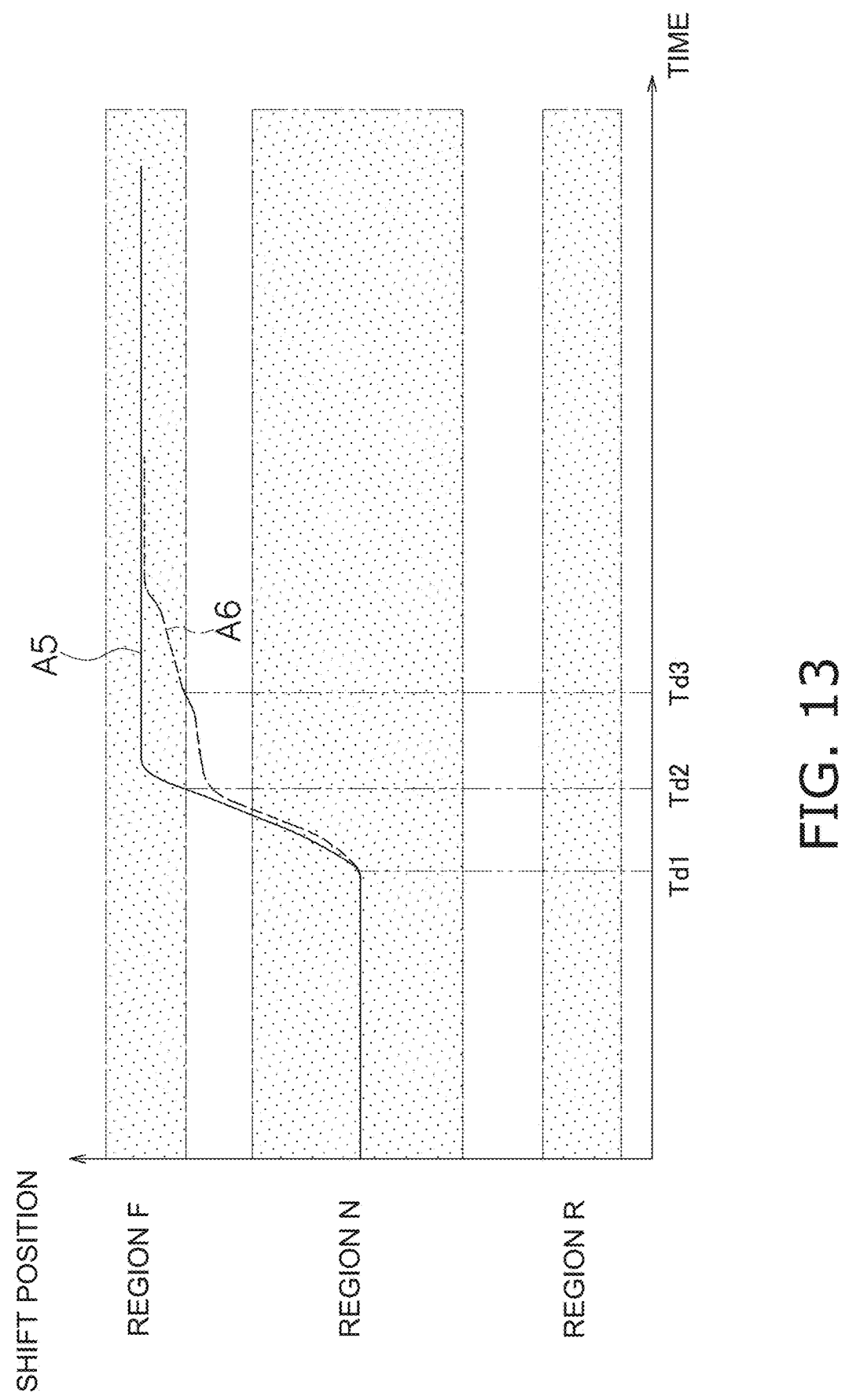
FIG. 13 is a chart showing a variation of a shift position.

FIG. 13 is a chart showing a variation of the shift position. In FIG. 13, solid line A5 indicates the variation of the shift position in a normal condition. Broken line A6 indicates the variation of the shift position in an abnormal condition. When the dog clutch 38 is located in a positional range indicated by "region F" shown in FIG. 13, the shift position is regarded as being switched to the forward moving position. When the dog clutch 38 is located in a positional range indicated by "region N" shown in FIG. 13, the shift position is regarded as being switched to the neutral position. When the dog clutch 38 is located in a positional range indicated by "region R" shown in FIG. 13, the shift position is regarded as being switched to the rearward moving position.

In FIG. 13, as depicted with solid line A5, the throttle-shift operating device 64 outputs a command signal to switch the shift position from the neutral position to the forward moving position at time Td1. Here, in the normal condition, the shift position is actually switched to the forward moving position at time Td2. However, when the dog clutch 38 causes slippage due to wearing thereof, it takes a longer time to switch the shift position to the forward moving position from a point in time of outputting the command signal. Because of this, as depicted with broken line A6, the shift position is actually switched to the forward moving position at time Td3 later than time Td2.

The watercraft computer 5 records, as the status data, a length of time required to actually switch the shift position to the forward moving position from a point in time of outputting the command signal (hereinafter referred to as shift completion time). The watercraft computer 5 determines whether or not the malfunction or trouble of the dog clutch 38 has occurred based on the shift completion time.

Figure 14:
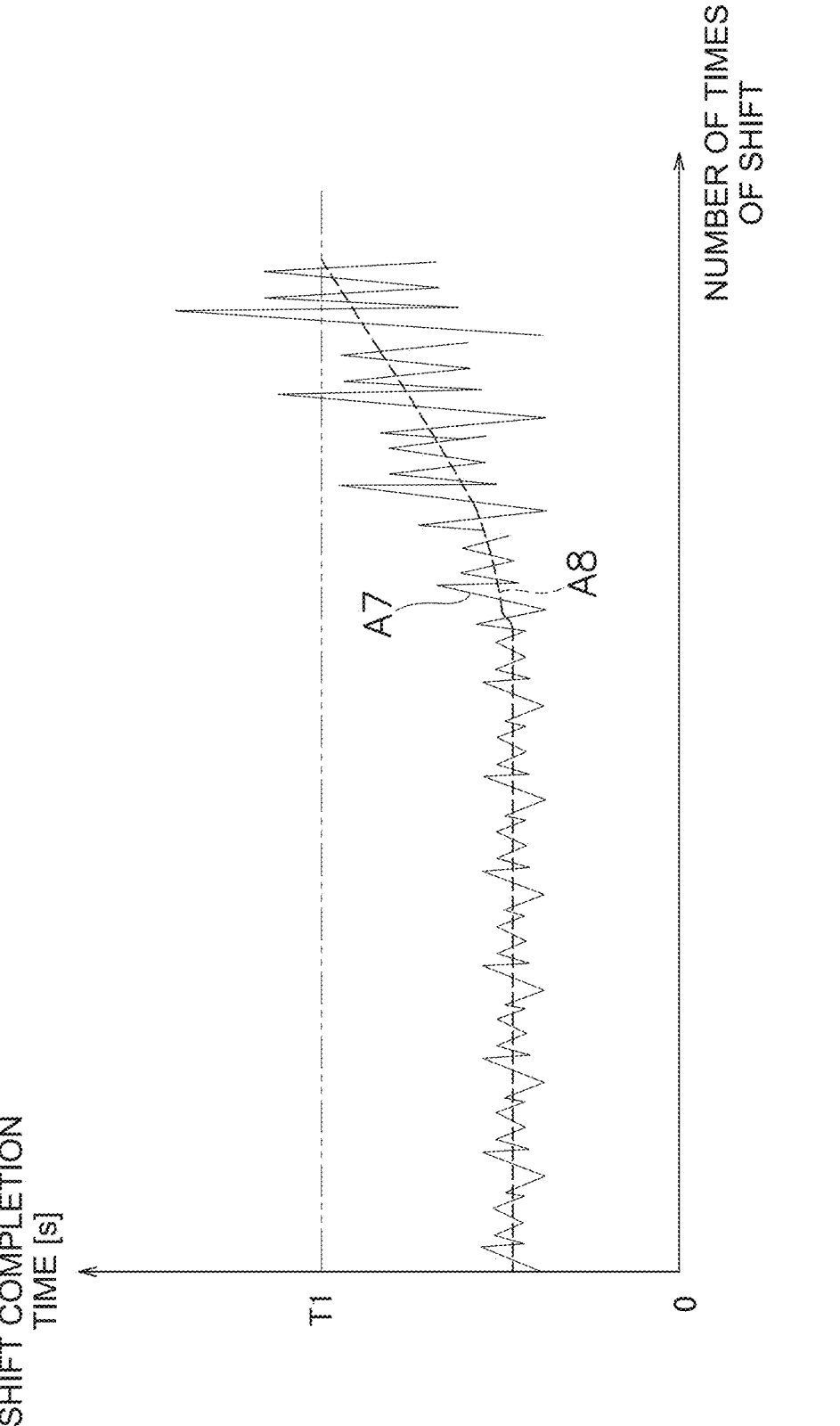
FIG. 14 is a chart showing a variation of shift completion time at a single time of a shift position switching operation and a variation of an average of shift completion time in a predetermined number of times of the shift position switching operation.

More specifically, the watercraft computer 5 determines whether or not the malfunction or trouble of the dog clutch 38 has occurred based on the average of the shift completion time in a predetermined number of times of a shift position switching operation. In FIG. 14, solid line A7 indicates a variation of the shift completion time at a single time of the shift position switching operation. Broken line A8 indicates a variation of an average of the shift completion time in a predetermined number of times of the shift position switching operation. The watercraft computer 5 determines that the malfunction or trouble of the dog clutch 38 has occurred when the average of the shift completion time becomes greater than a threshold T1.

It should be noted that, when the shift position is switched to the rearward moving position, the watercraft computer 5 determines whether or not the malfunction or trouble has occurred by setting a length of time required to actually switch the shift position to the rearward moving position as the shift completion time. Instead of the average of the shift completion time, the maximum or dispersion of the shift completion time may be used. Alternatively, when the shift position switching operation has been continuously repeated a predetermined number of times or greater, the watercraft computer 5 may determine that the malfunction or trouble has occurred.

The decision logic 80 includes an engine stall logic 85. The engine stall logic 85 determines that a malfunction or trouble has occurred when the engine 10 has been stopped after start of the engine 10 even though the kill switch 72 has not been operated (turned on). In other words, when the engine 10 has been stopped, even though the start switch 71 has been turned on while the kill switch 72 is turned off, the watercraft computer 5 determines that the engine 10 has been stalled due to the malfunction or trouble.

When it is determined that the malfunction or trouble has occurred, the watercraft computer 5 causes the display 73 to display a notification of the malfunction or trouble. When it is determined that the malfunction or trouble has occurred, the watercraft computer 5 transmits the notification of the malfunction or trouble to the server 6. Alternatively, when it is determined that the malfunction or trouble has occurred, the watercraft computer 5 transmits the notification of the malfunction or trouble to the user terminal 7.

In the control system 200 for the watercraft 100 according to an example embodiment explained above, a user is able to determine an occurrence of a malfunction or trouble of the watercraft 100 in an initial phase of the occurrence of the malfunction or trouble.

It should be noted that the watercraft computer 5 obtains data to update the decision logic 80 from the server 6. The watercraft computer 5 updates the decision logic 80 based on the update data. Then, with reference to the updated decision logic 80, the watercraft computer 5 determines whether or not the malfunction or trouble of the watercraft 100 has occurred based on the status data. Accordingly, the watercraft computer 5 is able to determine whether or not the malfunction or trouble has occurred by using the latest decision logic 80.

Example embodiments of the present invention have been explained above. However, the present invention is not limited to the example embodiments described above, and a variety of changes can be made without departing from the gist of the present invention.

The marine propulsion device 1 is not limited to the outboard motor, and alternatively, may be another type of propulsion device such as an inboard engine outboard drive or a jet propulsion device. The structure of the marine propulsion device 1 is not limited to that in the example embodiments described above and may be changed. For example, the marine propulsion device 1 may include an electric motor instead of the engine 10.

The status data are not limited to those in the example embodiments described above and may be changed. Determining whether or not the malfunction or trouble of the watercraft 100 has occurred based on the status data is not limited to that in the example embodiments described above and may be changed. Determining whether or not the malfunction or trouble of the watercraft 100 has occurred based on the status data may not be necessarily made by the watercraft computer 5, and alternatively, may be made by the server 6. In this case, the watercraft computer 5 transmits the status data to the server 6 through the communication device 3. The server 6 stores the decision logic 80 described above. Thus, determining whether or not the malfunction or trouble of the watercraft 100 has occurred is made by the server 6 with reference to the decision logic 80.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control system for a watercraft, the control system comprising:
 a device on or in the watercraft;
 a sensor to detect status data indicating a status of the device; and
 a computer configured or programmed to:
  store a decision logic to determine whether or not a malfunction or trouble of the watercraft has occurred; and
  determine whether or not the malfunction or trouble of the watercraft has occurred based on the status data with reference to the decision logic; wherein
 the device includes:
  a drive source;
  a shift mechanism including a clutch to transmit a drive force generated by the drive source; and
  a shift actuator to switch between engagement and disengagement of the clutch; and
 the computer is configured or programmed to:
  detect a number of times of an operation of the shift actuator to engage the clutch as the status data;
  determine whether the operation of the shift actuator is continuously repeated a predetermined number of times or greater; and
  determine that the malfunction or trouble has occurred in the clutch when the number of times of the operation of the shift actuator is continuously repeated to engage the clutch is the predetermined number of times or greater.

2. The control system according to claim 1, wherein
 the device includes an engine as the drive source and a delivery pipe to supply fuel to the engine; and
 the computer is configured or programmed to:
  obtain a pressure of the fuel inside the delivery pipe as the status data; and
  determine that the malfunction or trouble has occurred when the pressure of the fuel inside the delivery pipe has decreased by a predetermined value or greater after stopping the engine.

3. The control system according to claim 1, wherein
 the device includes an engine as the drive source, a starter motor for the engine, and a battery to supply electric power to the starter motor; and
 the computer is configured or programmed to:
  obtain at least one of a voltage or a current of the battery and a rotational speed of the engine at a start of the engine as the status data; and
  determine that the malfunction or trouble has occurred when the rotational speed of the engine at the start of the engine is less than a threshold.

4. The control system according to claim 1, wherein
 the device includes an engine as the drive source, the engine including a crankshaft, a crank sensor to detect a phase of the crankshaft, a camshaft, and a cam sensor to detect a phase of the camshaft; and
 the computer is configured or programmed to:
  obtain the phase of the crankshaft and the phase of the camshaft as the status data; and determine that the malfunction or trouble has occurred when the camshaft is abnormally displaced in phase with respect to the crankshaft.

5. A control system for a watercraft, the control system comprising:

a device on or in the watercraft;

a sensor to detect status data indicating a status of the device; and a computer configured or programmed to:

store a decision logic to determine whether or not a malfunction or trouble of the watercraft has occurred; and determine whether or not the malfunction or trouble of the watercraft has occurred based on the status data with reference to the decision logic;

the device includes:

a drive source;

a shift mechanism including a clutch to transmit a drive force generated by the drive source;

a shift actuator to switch between engagement and disengagement of the clutch; and the computer is configured or programmed to:

obtain an operation of the shift actuator as the status data; and determine that the malfunction or trouble has occurred when a length of time greater than or equal to a predetermined threshold has been required to complete the engagement of the clutch from a point in time of outputting a signal to command the shift actuator to cause the engagement of the clutch.

6. The control system according to claim 1, wherein the device includes an engine as the drive source and a kill switch to stop the engine; and the computer is configured or programmed to:

obtain an operation of the engine as the status data; and determine that the malfunction or trouble has occurred when the engine has been stopped although the kill switch has not been operated.

7. The control system according to claim 1, wherein the computer is configured or programmed to:

obtain update data for the decision logic;

update the decision logic based on the update data; and determine whether or not the malfunction or trouble of the watercraft has occurred based on the status data with reference to the updated decision logic.

8. The control system according to claim 7, further comprising:

a communication device to perform wireless communication with a server remote from the watercraft; wherein the computer is on or in the watercraft; and the computer is configured or programmed to receive the update data from the server through the communication device.

9. The control system according to claim 1, wherein the computer is a server remote from the watercraft;

the control system further comprises:

a communication device to perform wireless communication with the computer; and a controller on or in the watercraft; and the controller is configured or programmed to transmit the status data to the computer through the communication device.

10. A method for controlling a watercraft including a watercraft body and a device installed on or in the watercraft body, the method comprising:

obtaining status data indicating a status of the device; and determining whether or not a malfunction or trouble of the watercraft has occurred based on the status data with reference to a decision logic to determine whether or not the malfunction or trouble of the watercraft has occurred; wherein the device includes a drive source, a shift mechanism including a clutch to transmit a drive force generated by the drive source, and a shift actuator to switch between engagement and disengagement of the clutch, the method further comprising:

detecting a number of times of an operation of the shift actuator to engage the clutch as the status data;

determining whether the operation of the shift actuator is continuously repeated a predetermined number of times or greater; and determining that the malfunction or trouble has occurred in the clutch when the number of times of the operation of the shift actuator is continuously repeated to engage the clutch is the predetermined number of times or greater.

11. The method according to claim 10, wherein the device includes an engine as the drive source and a delivery pipe to supply fuel to the engine, the method further comprising:

obtaining a pressure of the fuel inside the delivery pipe as the status data; and determining that the malfunction or trouble has occurred when the pressure of the fuel inside the delivery pipe has decreased by a predetermined value or greater after stopping the engine.

12. The method according to claim 10, wherein the device includes an engine as the drive source, a starter motor for the engine, and a battery to supply electric power to the starter motor, the method further comprising:

obtaining at least one of a voltage or a current of the battery and a rotational speed of the engine at a start of the engine as the status data; and determining that the malfunction or trouble has occurred when the rotational speed of the engine at the start of the engine is less than a threshold.

13. The method according to claim 10, wherein the device includes an engine as the drive source, the engine including a crankshaft, a crank sensor to detect a phase of the crankshaft, a camshaft, and a cam sensor to detect a phase of the camshaft, the method further comprising:

obtaining the phase of the crankshaft and the phase of the camshaft as the status data; and determining that the malfunction or trouble has occurred when the camshaft is abnormally displaced in phase with respect to the crankshaft.

14. A method for controlling a watercraft including a watercraft body and a device installed on or in the watercraft body, the method comprising:

obtaining status data indicating a status of the device; and determining whether or not a malfunction or trouble of the watercraft has occurred based on the status data with reference to a decision logic to determine whether or not the malfunction or trouble of the watercraft has occurred; wherein the device includes a drive source, a shift mechanism including a clutch to transmit a drive force generated by the drive source, and a shift actuator to switch between engagement and disengagement of the clutch, the method further comprising:

obtaining an operation of the shift actuator as the status data; and determining that the malfunction or trouble has occurred when a length of time greater than or equal to a predetermined threshold has been required to complete the engagement of the clutch from a point in time of outputting a signal to command the shift actuator to cause the engagement of the clutch.

15. The method according to claim 10, wherein the device includes an engine as the drive source and a kill switch to stop the engine, the method further comprising:

obtaining an operation of the engine as the status data; and determining that the malfunction or trouble has occurred when the engine has been stopped although the kill switch has not been operated.

16. The method according to claim 10, further comprising:

obtaining update data for the decision logic;

updating the decision logic based on the update data; and determining whether or not the malfunction or trouble of the watercraft has occurred based on the status data with reference to the updated decision logic.

17. A watercraft comprising:

the control system according to claim 1.

\* \* \* \* \*